Aug. 20, 1963     F. V. F. PAUL     3,101,290

METHOD OF JOINING THE ENDS OF A MULTI-PLY LAMINATED BELT

Original Filed April 1, 1957

INVENTOR.
FRANCIS VICTOR FREDERIC PAUL

BY

ATTORNEY

United States Patent Office 3,101,290
Patented Aug. 20, 1963

3,101,290
METHOD OF JOINING THE ENDS OF A
MULTI-PLY LAMINATED BELT
Francis Victor Frederic Paul, Paris, France, assignor to
Societe Anonyme dite: Pneumatiques & Caoutchous
Manufacture Kleber Colombes, Place Valmy, Colombes, Seine, France
Original application Apr. 1, 1957, Ser. No. 649,665.
Divided and this application Mar. 17, 1958, Ser. No. 725,462
Claims priority, application France May 31, 1956
2 Claims. (Cl. 156—137)

This invention relates to the manufacture of conveyer belts and is more particularly concerned with a method of joining the ends of a multi-ply laminated belt to produce an endless belt and is particularly applicable to a conveyer belt of the type comprising a plurality of laminated plies including rubber or a rubber-like compound wherein at least one inner ply has flexible reinforcement means extending therein and embedded in the rubber or rubber-like compound.

It is an object of the invention to provide an improved method of joining the ends of a multi-ply laminated belt, particularly one having the improved reinforcement structure described in my copending application, Serial No. 649,665, filed April 1, 1957, now abandoned of which the present application is a division.

It is another object of the invention to provide a method of joining the ends of a multi-ply laminated belt which possesses improved characteristics as a result of a more uniform distribution of loads and the absence of friction between adjacent longitudinal reinforcement elements.

Other objects of the invention will appear as the description proceeds.

The invention is primarily—though by no means exclusively—applicable to the type of conveyer belts disclosed in French Patent No. 1,115,443. The belt there disclosed comprises a multiply laminated assembly including a first ply having exclusively longitudinal armature means therein in the form of longitudinally extending wire cables, and a second ply having exclusively transverse armature means therein in the form of transversely extending wire cables, said second ply being positioned substantially centrally of the depth dimension of the belt, and said first ply being positioned adjacent the side of the belt remote from the carrier side thereof, the top cover on the carrier side may extend over a depth substantially equal to one half the total depth of the belt. Means are further provided for increasing the transverse stiffness of the belt in that area of the cross section thereof which is stressed in tension when the belt assumes a trough shaped configuration in service, between the above-mentioned first and second plies. The said stiffener means may comprise a ply of cord fabric or a ply of twill fabric or a high-modulus rubber layer.

The invention when applied to a belt assembly of the type just specified or similar types is particularly applicable to the construction of the first above mentioned ply comprising the longitudinal armature means therein.

According to a broad feature of the invention, the armature means used comprise wire strands rather than cables. While strands as opposed to cables or rope conventionally have the defect of becoming untwined throughout their length in case one of the outer wires therein should break at any point, this condition cannot arise where strands are used in accordance with the invention since the strands are completely imbedded in a mass of cured rubber or other similar compound. On the other hand, strands have various advantages over cables, including higher tensile strength for a given diameter, more uniform distribution of the inner pressure loads between the constituent wires, and lower cost of manufacture. All of these advantages are retained when strands are used according to the invention as longitudinal armature means in a conveyer belt.

According to a further important feature, the individual wires comprising the strand are so arranged in relation to one another and preferably to the core of the strand, that they remain out of contact with one another but leave intervening spaces therebetween. During the vulcanizing or equivalent curing process, just before the rubber-like mass has set, the mass will flow into and completely fill the said spaces so that the core of the strand and each individual wire thereof is substantially completely coated with the mass. In the finished belt therefore, the armature wires are isolated from one another. This prevents undesirable metal-to-metal contact and friction, thereby increasing the service life of the armature and improving the load-taking characteristics of it.

Some exemplary embodiments of the invention will now be described for purposes of illustration but not of limitation with reference to the accompanying diagrammatic drawings wherein.

Figure 1:
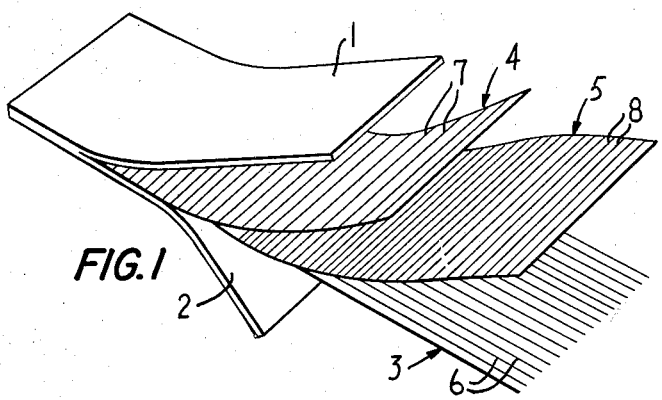
FIG. 1 illustrates in simplified isometric showing part of a conveyer belt according to the invention with the plies partly delaminated to show the inner construction thereof.

As shown in FIG. 1, a conveyer belt according to the invention may comprise a pair of outer plies or skin coatings 1 and 2 bonded on opposite sides of an inner armature assembly, the latter comprised of a pair of webs 3 and 4 of wire strands, and a central web 5 of textile strands rope or cable. Web 3 comprises cord fabric wherein the strands 6 extend longitudinally of the belt. The strands 6, described in greater detail hereinafter, are bonded by means of rubber or similar compound within a cord fabric which may be produced in any conventional way as in a calender press or the like, and is readily applicable over the comparatively thin, flexible wire strands used.

The web 4 may likewise comprise cord fabric but the wire cables or strands 7 imbedded therein extend crosswise of the belt.

The central web or ply 5 in the exemplary construction shown comprises a fabric with textile strands rope cable imbedded therein, e.g. made of cotton, rayon or the like, and extending parallel to the cables 7, i.e. crosswise of the belt.

Figure 2:
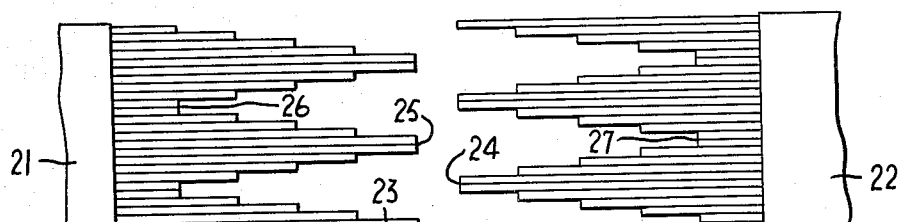
FIG. 2 is a plan view illustrating the manner in which adjacent ends of the finished belt are cut away prior to being bonded into an endless belt and vulcanized.

Referring to FIG. 2, the ends of the resulting belt may be conveniently joined together to form an endless belt in a manner now to be described. The outer skin plies 1 and 2 are cut away over appropriate lengths from each end as shown at 21 and 22, and both transverse armature plies 4 and 5 are removed to leave only the corresponding end portions of the longitudinal armature ply 3. The longitudinally extending strands comprising this ply are then cut to complementary sawtooth configurations such as to be internestable with one another as clearly shown in the drawing. In order that the tension strains in the finished belt shall be as uniform as possible, the individual strands 23 should preferably be so cut as to retain substantially constant angles with respect to the longitudinal direction of the belt. This requires that the longitudinal spacing or displacement between the ends of adjacent cables will be substantially the same, as shown. Moreover, further to equalize the tension strains two (as shown) or more strands are preferably provided at the apex of each sawtooth, as at 24 and 25, and correspondingly the same number of strands (two herein) are retained in the valleys between adjacent sawteeth, as at 26 and 27.

In accordance with an important feature of this invention, the individual armature units 6 in the longitudinal armature web 3 are comprised of wire strands and at least some of the wires in each strand are spaced from one another so as to permit the flow of rubber or other bonding compound into the intervening spaces. This feature of the invention may be accomplished in many different ways, but a few exemplary configurations of strands which have yielded successful results in this connection are illustrated in FIGS. 3 to 7. As seen in FIG. 2, each belt end has two symmetrical saw teeth with each side of these saw teeth being defined by an equal number of equally displaced steps represented by the free ends of the armature units forming each saw tooth. In addition, it will be seen that the number of armature units forming each step on the side of each sawtooth is only half the number of armature units forming each apex and each valley.

Figure 3:
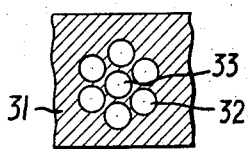
FIGS. 3 to 7 are cross sectional views, to an enlarged scale, illustrating various exemplary constructions of belt armature means according to the invention.

In FIG. 3, the compound 31 is shown as imbedding a strand comprised of a central core wire 33 and six surrounding wires 32 twisted around the core so as to leave intervening spaces between adjacent ones of the six wires 32 and preferably between each of the wires 32 and the core 33. The core 33 may be made of steel, natural or synthetic textile fibre, or natural or synthetic rubber compounds, cured or uncured, and its diameter should preferably be larger than that of each of the outer wires 32.

Figure 4:
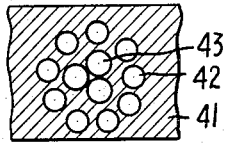

In FIG. 4 there is shown a central core assembly comprising three wires 43, which may comprise similar materials as the single core wire 33 of FIG. 3, and an outer layer comprising the nine wires 42. The outer wires 42 are steel, and are of smaller diameter than that of each core wire 43. As shown, the rubber compound 41 again completely impregnates the intervening spaces between the respective outer wires 42 and between the outer wires and the inner core 43.

Figure 5:
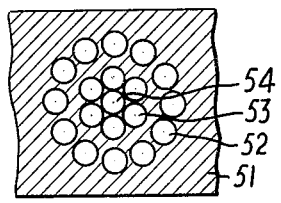

In FIG. 5 there is provided a single core wire 54 surrounded by an inner layer of six wires 53 surrounded in turn by an outer layer of twelve wires 52. Both the inner and outer wires 52 and 53 may be steel while the central or core wire 54 may be made of any of the substances previously listed in connection with the cores 33 and 43 of FIG. 4. The core wire 54 is larger in diameter than each of the wires 53, which in turn may be larger than or equal to the diameter of the outer wires 52. The rubber compound 51 completely impregnates or coats each wire 52 of the outer layer.

Figure 6:
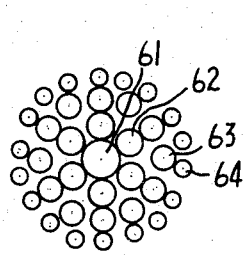

In FIG. 6 there is shown a strand comprising 37 wires, including one central core wire 61, surrounded by a layer of six wires 62, surrounded by a layer of twelve wires 63 surrounded by a layer of eighteen wires 64. This pattern may be described as 1+6+12+18. The core 61 which may be steel or other material as listed above, is of largest diameter. The remaining wires are preferably all steel, with the wires 62 of the innermost layer smaller in diameter than the core 61. The wires in the next two layers 63 and 64 may be equal in diameter to that of wires 62 or may have decreasing diameters.

Figure 7:
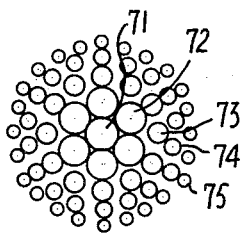

In FIG. 7 there is shown a strand including sixty-one wires, the pattern being (1+6+12+18+24), and may be considered as derived from the configuration shown in FIG. 6 by simply adding thereto an additional outermost layer comprising twenty-four wires 75. The wires in the successive sets 72, 73, 74, 75 surrounding the core 71, are shown as having decreasing diameters.

By providing outer wires of lesser diameter than that of the core, and preferably of continually decreasing diameter from the center outward where more than one layer surrounding the core are provided, it is found that a relationship is obtained whereby the rubber or other bonding compound will readily flow into the intervening spaces between the wires and will penetrate down to the core during the curing, or vulcanizing step, thereby achieving the advantages of the invention previously mentioned, including the steel-to-rubber bond and minimizing or eliminating any metal-to-metal friction in the completed conveyor belt in service. However, a similar result may be accomplished in yet other ways. Thus, instead of or in addition to using wires of decreasing diameter as described above, the number of wires in the set or layer of each successive set or layer surrounding the core, may be reduced with respect to the numbers heretofore indicated in connection with FIGS. 3 to 7 which latter numbers were selected because they correspond to standard wire strand configurations frequently used in conventional wire rope manufacture.

In connection with this last-mentioned modified form of the invention the following exemplary configurations may be indicated as having been satisfactorily tested.

(a) Six-wire strand: 1 core wire and one outer set of 5 wires.

(b) Eleven-wire strand: one 3-wire core and one outer set of 8 wires.

(c) Seventeen-wire strand: 1 core wire, one first set of 5 wires and one outermost set of 11 wires.

(d) Thirty-four-wire strand: 1 core wire, a first set of 5 wires, a second set of 11 wires and an outermost set of 17 wires.

(e) Fifty-seven-wire strand: 1 core wire, a first set of 5 wires, a second set of 11 wires, a third set of 17 wires and an outermost set of 23 wires.

It will be understood that in connection with both forms of the invention described, it is not essential for each individual wire to be completely coated with bonding compound throughout its circumference. In order for the benefits of the invention to be obtained, the important thing is that sufficient angular space be present between the adjacent wires of each set twisted around the core, to ensure that the compound prior to setting will flow through such spaces all the way down to the surface of the central core of the strand.

Those familiar with the art will readily understand that the teachings of the invention are applicable to any wire armature structure for conveyer belts and the like wherein one or more webs of reinforcement wire is or are bonded in a rubber or equivalent sheet. While the invention has been found to possess particular advantage in connection with the longitudinal reinforcement structure of conveyer belts of the type specified in the beginning of the specification it is not, therefore, to be construed as limited thereto, and the only limitations imposable on the scope of the invention are those required by the ensuing claims.

What I claim is:

1. The method of forming an endless belt by joining the ends of a multi-ply laminated belt formed from a plurality of plies including a reinforced ply defined by a plurality of separate flexible longitudinal armature units embedded in a mass of bonding compound which comprises the steps of removing the plies other than said reinforced ply from said reinforced ply over substantially equal longitudinal lengths at each of said ends of the laminated belt to be joined, cutting the thus uncovered end portions of said reinforced ply into complementary internestable sawtooth configurations with each side of a sawtooth comprising an equal number of equally displaced free end portions of said armature units with at least two adjacent armature units of equal length at each sawtooth apex and at least two adjacent armature units in each valley between adjacent apices, internesting the sawteeth of the two ends of said belt with an apex of one end being received in a valley of the other end, replacing the removed plies upon said internested ends and bonding and curing the resultant assembly.

2. The method of forming an endless belt by joining the ends of a multi-ply laminated belt formed from a plurality of plies including a reinforced ply defined by a plurality of separate flexible longitudinal armature units embedded in a mass of bonding compound which comprises the steps of removing the plies other than said reinforced ply from said reinforced ply over substantially equal longitudinal lengths at each of said ends of the laminated belt to be joined, cutting the thus uncovered end portions of said reinforced ply into complementary internestable sawtooth configurations with at least one of said configurations of each end portion being symmetrical and equal in form and with each side of each sawtooth comprising an equal number of equally displaced steps defined by the free end portions of said armature units with at least two adjacent armature units of equal length at each sawtooth apex and at least two adjacent armature units in each valley between adjacent apices and the number of armature units at each step on each sawtooth side being at most one half the number of armature units at said apices and in said valleys, internesting the sawteeth of the two ends of said belt with an apex of one end being received in a valley of the other end, replacing the removed plies upon said internested ends and bonding and curing the resultant assembly.

References Cited in the file of this patent

UNITED STATES PATENTS

| | | |
|---|---|---|
| 1,588,255 | Maxwell | June 8, 1926 |
| 1,735,686 | Kimmich | Nov. 12, 1929 |
| 2,182,169 | Bierer | Dec. 5, 1939 |
| 2,281,148 | Freedlander | Apr. 28, 1942 |

FOREIGN PATENTS

| | | |
|---|---|---|
| 319,416 | Great Britain | Sept. 26, 1929 |